April 25, 1967     E. C. BRAUN, JR     3,315,614

TOWLINE CART STOPPING DEVICE

Filed Nov. 10, 1964     3 Sheets-Sheet 1

INVENTOR
EDWIN C. BRAUN, JR
BY Alberton Zalkind

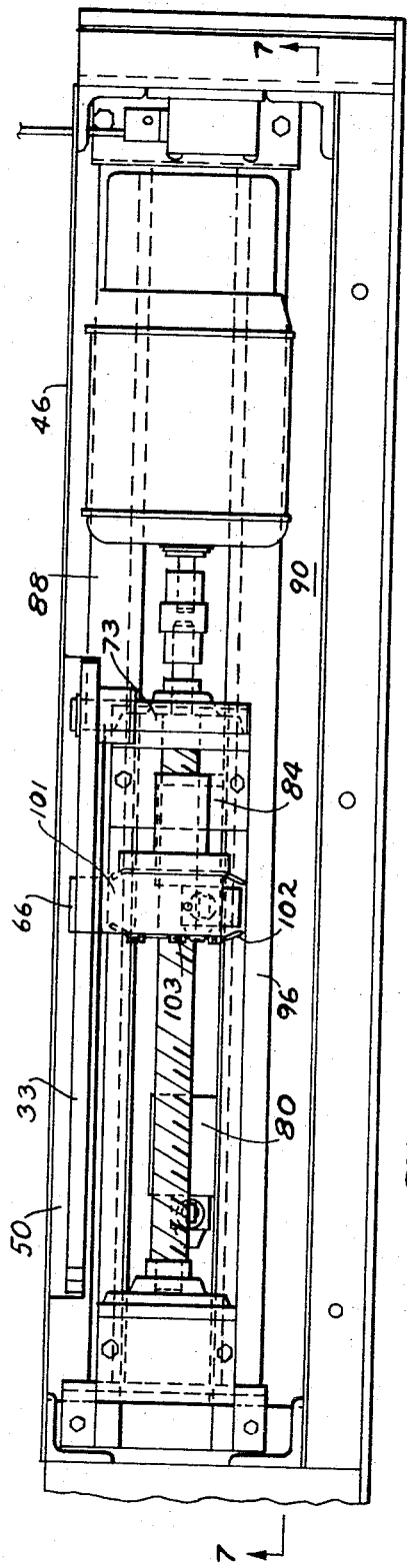
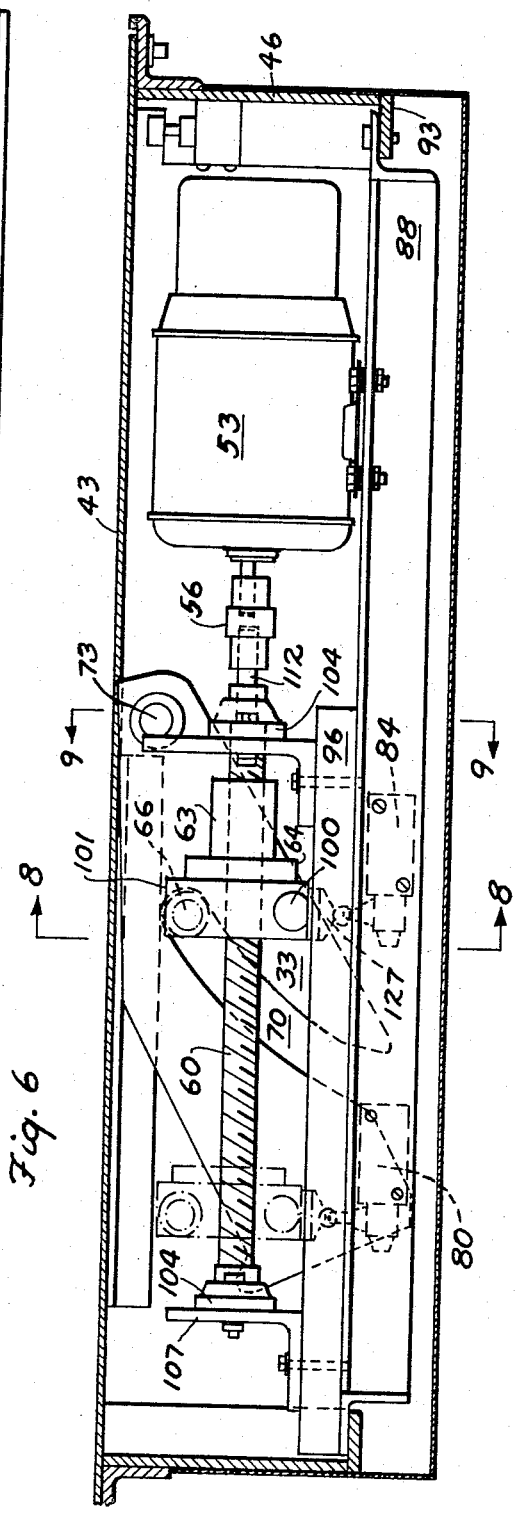
Fig. 6
Fig. 7

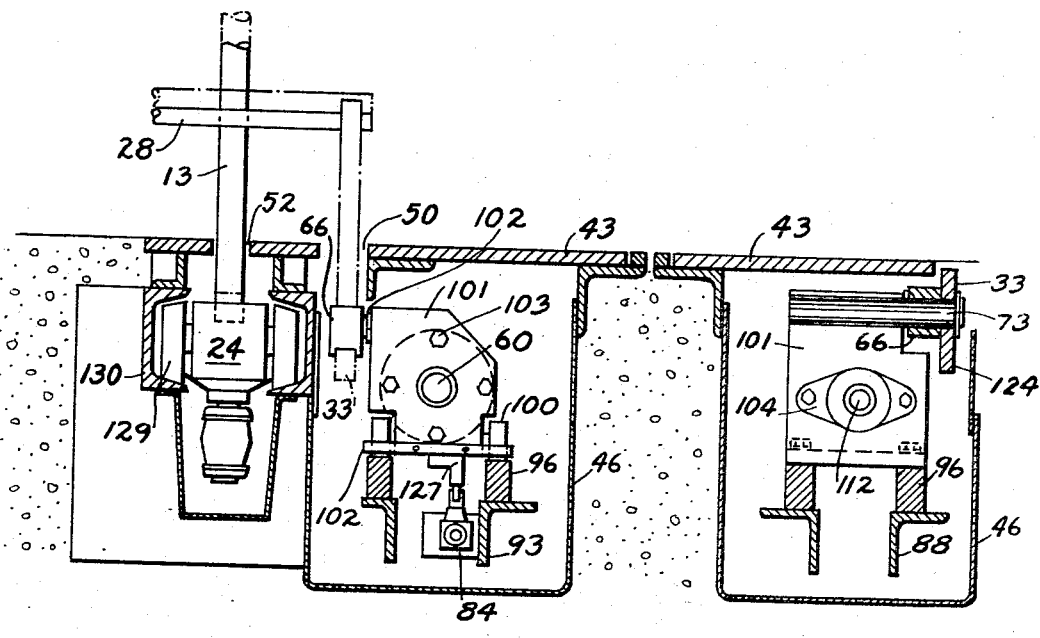
Fig. 8    Fig. 9
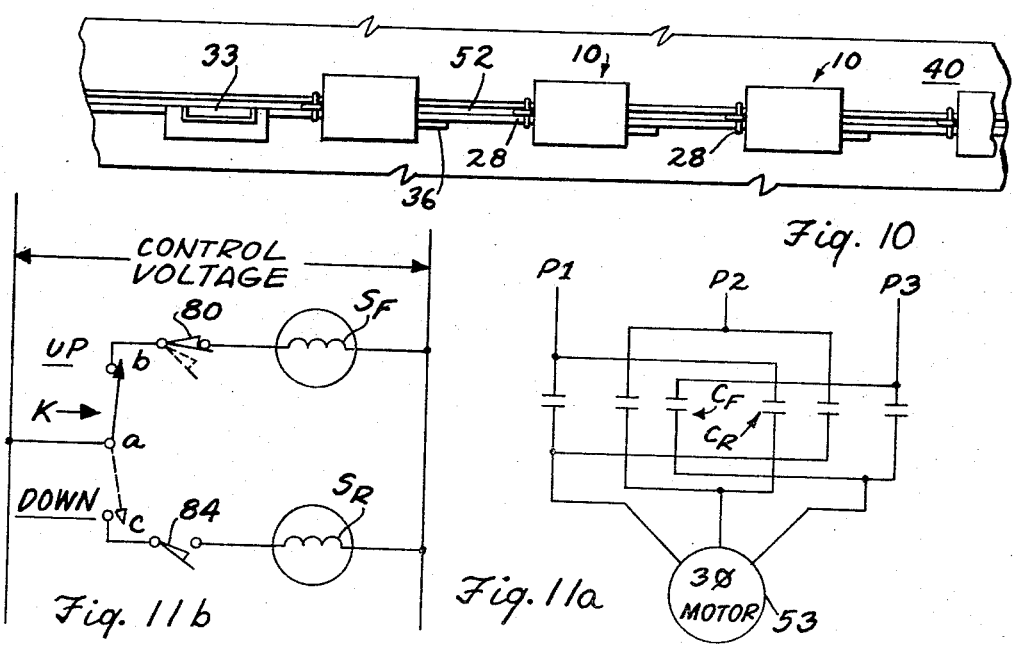
Fig. 10
Fig. 11b    Fig. 11a

United States Patent Office 3,315,614
Patented Apr. 25, 1967

3,315,614
TOWLINE CART STOPPING DEVICE
Edwin C. Braun, Jr., Smithsburg, Md., assignor to Aerojet-General Corporation, Azusa, Calif., a corporation of Ohio
Filed Nov. 10, 1964, Ser. No. 410,215
4 Claims. (Cl. 104—172)

This invention relates to industrial cart systems of the type wherein a series of carts are moved across the floor of a factory or warehouse by means of towpins carried by the carts which protrude into a floor slot for engagement with a towline chain. Such systems are conventional and are installed in many variations whereby carts may be switched from one track to another, stored on tracks, maintained stationary, and generally controlled so as to be routed from one point to another in a large area by means of selective engagement and disengagement of respective towpins with chains below the floor. The chains are power operated and continuously moved; any cart can be caused to move or to stop by lowering or raising a towpin in the slot over which the cart stands so as to engage or disengage a dog directly below the slot.

When "on the line" accumulations is required, the usual construction of the towpin on each cart consists of a bumper linkage actuated by engaging another cart or a cart stop in order to lift the respective towpin by a cam action. Such a linkage is a relatively expensive mechanism and in large systems involving several hundred carts the expense is proportionally high.

It is an object of the present invention to effect considerable economy by minimizing the mechanism carried by individual carts. It is another object of the invention to provide a system which is very versatile in cart control as to storage and accumulation, particularly in areas where two or more towlines may connect.

It is a further object of the invention to provide a system which is versatile insofar as operator or manual control of carts is concerned or combinations of manual and automatic control.

Other objects and features of the invention will be apparent from the description which follows.

Briefly, the invention utilizes conventional carts and floor slot and towline arrangements wherein a stopping device consisting of a cam normally disposed below the floor can be caused to rise upwardly and through a slot adjacent the guide slot. Such cam, when raised, can engage a crossbar secured to the usual towpin to lift the towpin out of engagement with the towline. Thus, any cart can be stopped. Further, each cart carries at its rear a cam integrally fixed thereto and so disposed that a subsequent cart would engage therewith by means of the crossbar fixed to the towpin thereof, thus stopping the subsequent cart by effecting disengagement of its towpin. In a similar manner any number of carts can be automatically stopped as the crossbar of each engages the rearwardly extending cam of the cart in front.

The above described arrangement can be used anywhere in a towline system and the cam below the floor is power operated by an electric motor which may be subject to push button control, photoelectric control, programming, and the like. The system is useful, not only for routing carts as desired, but also for avoiding collisions at merging points and maintaining as continuous a cart flow as possible.

A detailed description of the invention now follows in conjunction with the appended drawings in which:

FIG. 6 is a plan view showing details of the construction of the power operated cam, the housing cover being removed from the casing which surrounds the mechanism;

FIG. 7 is an elevation showing details of the power operated cam as a section through 7—7 of FIG. 6;

FIG. 8 is a section through 8—8 of FIG. 7, additional structure being added comprising the towline and floor slot as well as a portion of a towpin and crossbar in order to show coaction with the power operated cam of the invention;

FIG. 9 is a section through 9—9 of FIG. 7;

FIG. 10 is a diagrammatic view of a series of carts approaching a stopping point;

FIGS. 11a and 11b show an exemplary electrical schematic control system.

Figure 1:
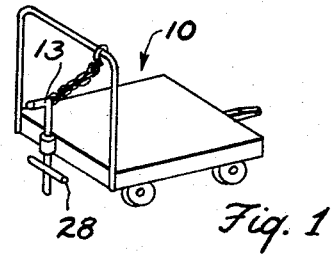
FIG. 1 is a perspective of a cart showing a towpin and crossbar carried at the front end.
Figure 2:
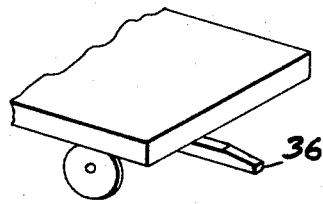
FIG. 2 is a perspective showing the rear of a cart with a cam fixed thereto.
Figure 2A:
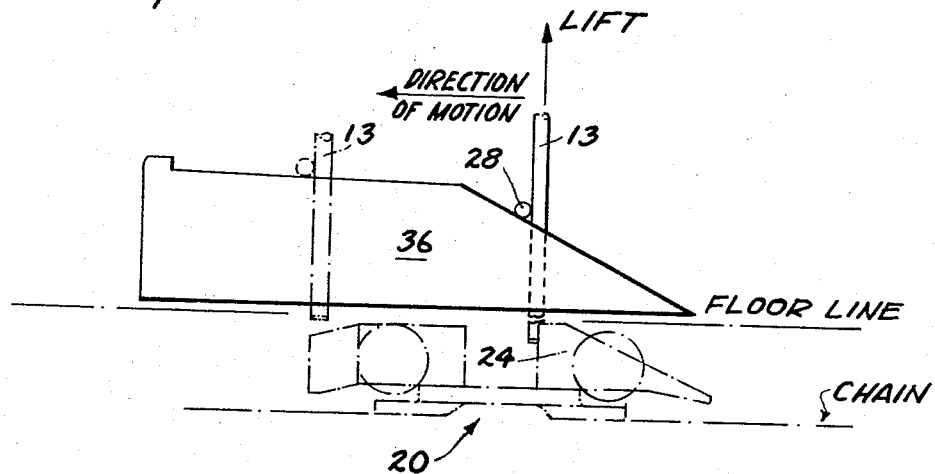
FIG. 2a is an enlarged view of the rear cam for the carts illustrating coaction with a towpin and crossbar.

Referring now to FIG. 1, a conventional cart 10 is shown as used in present towline systems having the usual towpin 13 slidably carried in a collar 15 so that it may be lowered or raised for engagement with a towline as indicated generally at 20 in FIG. 2a. Thus, the pin 13 may be lowered to engage a dog 24 as shown at the right or raised to disengage as shown at the left in phantom.

In the present invention a crossbar 28 is secured to the towpin which crossbar may engage either with a cam 33 (see FIG. 5) to lift the towpin out of engagement, or may engage with a cam such as 36 (FIGS. 2 and 2a) fixed to the rear of the preceding cart to be thereby lifted out of engagement and thus the following car stopped. The pin may have any suitable means such as grooves coacting with a key (not shown) in the collar to prevent rotation so that the crossbar will remain transverse to travel direction. Crossbar 28 may be welded directly, as shown, or on a setscrew collar to be secured at various positions on the pin vertically, or rotatively so that the pin can be rotated to present unworn surfaces to the chain dogs.

Figure 3:
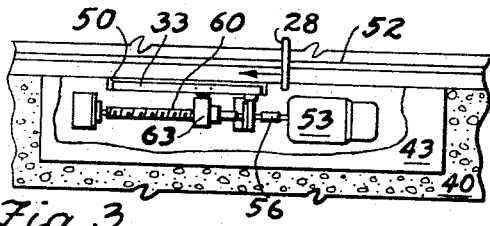
FIG. 3 is a generally simplified plan view showing a power operated cam which rises through a slot in the floor in order to engage and lift towpins.
Figure 4:
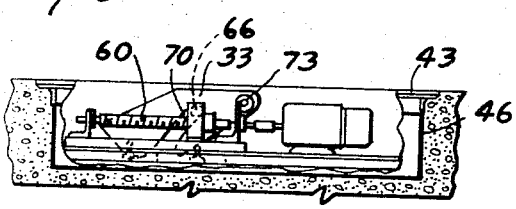
FIG. 4 is a fragmentary elevation in simplified form of the arrangement showing the power operable cam in down position below the floor level.
Figure 5:
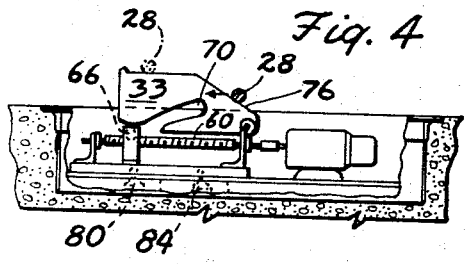
FIG. 5 is a simplified illustration similar to FIG. 4 showing the cam in raised position for lifting towpins in order to stop carts.

Referring particularly to FIGS. 3, 4 and 5, the plan view of FIG. 3 shows the flooring 40 in which may be inserted a metal plate 43 to serve as a cover for a housing 46 (FIG. 4) suitably sunk into an opening in the floor. The plate 43 is provided with an edge slot 50 through which the cam 33 can rise from or recede into housing 46. Towline slot 52 is adjacent to and parallel with slot 50 in the cover plate and it will be understood that the towline slot extends as part of a towline system. Crossbar 28 is shown (FIG. 3) over the towline slot, as exemplary, moving in the direction of the arrow and being thus raised to the phantom line position (FIG. 2a) by the cam 33 (FIG. 5).

The cam 33 (FIGS. 3–5) is power operated by a reversible electrical motor 53 connected by a coupling 56 to a lead screw 60 which carries a nut 63, having an integral flange 64 (FIG. 7) and being translatable in both directions by rotation of screw 60, as effected by the reversible motor. The nut connects to a roller 66 which traverses a slot 70 in the plate-like cam 33. The cam is pivoted at one end in a pintle 73 so that as the nut 63 moves to the left roller 66 operating in the slot will cause the cam to swing upwardly from the position of FIG. 4 to the position shown in FIG. 5. Thus, a crossbar 28 moving toward the cam 33 will engage the sloping edge 76 and have a resultant motion which lifts the towpin out of engagement with the towline dog 24 (FIG. 2a).

Nut 63 is controlled as to extent of movement by a pair of spaced limit switches 80 and 84. Thus, as the cam moves toward the left as seen in FIG. 5 it will actuate switch 80 to stop the motor or to stop and reverse the motor, depending on the type of circuitry used for the desired operation of the particular cam. Similarly upon reverse movement when nut 6 engages switch 84 the motor will stop or again reverse.

Referring now to FIGS. 6–9, the details of construction are seen to comprise a pair of base rails 88 and 90 spaced traversely in housing 46 and secured by brackets 93 at each end of the housing which rails carry bars 96 which serve as roller tracks for guide rollers 100 carried by the nut 63 which prevent rotation of the nut. Rollers 100 are carried in the edges of a plate 101 bolted as by four bolts 103 to nut flange 64. Wiper bars 102 are screwed to plate 101 (FIGS. 6–8) and slide on the rails 96 to keep them clear of dirt and grime, etc.

Screw 60 is carried between a pair of bearing blocks 104 secured to respective support angles 107 which are fastened to the rails 96. As will be noted in FIG. 7 the motor is coupled through the coupling 56 and a shaft 112 to lead screw 60 and shaft 112 may be considered integral therewith. The motor may be bolted to the horizontal flanges of rails 88 and 90 as shown for rail 88 in FIG. 7.

Cam plate 33 is carried on the shaft 73 (FIG. 9). The cam plate may swivel freely on shaft 73 and is retained by a disc 124 secured on the shaft as by a split washer or the like as shown on FIG. 9. Roller 66 is affixed to the upper side of plate 101, on a shaft 102 (FIG. 8) and is free to rotate when progressing transversely in slot 70 (FIG. 5).

At its lowermost edge plate 101 carries a cam 127 which can engage rollers on switches 80 and 84 for actuation thereof. Thus on FIG. 7 switch 84 will be seen to be depressed by the cam 127 shown in full lines, while at the end of traverse of the cam 127, shown in phantom lines, switch 80 is depressed.

Referring to FIG. 8 the towline will be seen to be of generally conventional nature having dogs such as 24 carried by rollers 129 in flanges 130 suitably secured below floor level and it will be noted that towpin 13 as shown in full lines is engaged by the dog, the condition being as illustrated in FIG. 2a. Crossbar 28 is shown in the position it has at this time, in full lines. Thus, it will be assumed that pin 13 is approaching cam 33 as shown in FIG. 5. Upon abutment with the cam, now raised to the phantom line position shown in FIG. 8, the crossbar rides up the surface 76 (FIG. 2a) lifting pin 13 to the phantom line position and thus disengaging it from dog 24, to stop the car. As has heretofore been explained, subsequent carts automatically stop by engagement of their crossbars with the cams 36 fixed at the rear of respective preceding carts.

FIG. 10 illustrates in plan a series of carts 10 guided in floor slot 52 and approaching cam 33. Upon the cam being raised, the first cam in the series is stopped and all subsequent cams likewise stopped by virtue of coaction between cams 36 and bars 28, all as heretofore explained.

FIGS. 11a and 11b illustrate one mode of control for raising and lifting the cam 33 in response to the opening and closing of switches 80 and 84, which will be understood to be normally closed switches. Thus motor 53 is a three-phase reversible motor powered from lines P–1, P–2 and P–3. The motor starter system comprises two sets of triple contact elements, for forward and reverse movement of the nut 63, such contact sets being designated, respectively, as $C_F$ (forward) and $C_R$ (reverse).

The forward and reverse contact sets are conventional in reversing motors of the three-phase type, and the hookup is as shown in FIG. 11a, being conventionally controlled by solenoids $S_F$ and $S_R$, respectively, FIG. 11b. Control of the contact sets is responsive to switches 80 and 84, alternately, in series with a single pole, double-throw, manually operable switch K for energizing either of the solenoids $S_F$ and $S_R$.

Thus the switch K can be thrown so as to be in series via switch 80 or 84 to energize, respectively, $S_F$ or $S_R$ by means of the "control voltage" lines shown in FIG. 11b. If nut 63 be considered as being in position so that cam 33 is down, i.e., below floor level, the normally closed switch 84 is maintained open, as shown, by the cam 127 (FIG. 7). At that time switch K is in the dotted "DOWN" position shown and $S_R$ is deenergized as is $S_F$, connection a–b being open, and all contacts are open in the sets $C_F$ and $C_R$.

If it now be desired to raise the cam 33, switch K is thrown to the solid line "UP" position, and since switch 80 is closed at this time a series circuit is set up energizing solenoid $S_F$, effecting engagement of contacts $C_F$, whence forward rotation of the motor ensues. Travel of nut 63 then raises the cam 33 until cam 127 opens switch 80, as shown by the dotted position, deenergizing solenoid $S_F$ and leaving cam 33 in raised position.

To lower cam 33, switch K is thrown to the dotted position, making the connection a–c and opening a–b, and switch 84 (closed at this time since cam 127 is at the other end of travel) completes a series circuit through solenoid $S_R$ to effect engagement of contact set $C_R$ which reverses the line connections P–1 and P–2 and therefore energizes the motor with reverse rotation. Accordingly the motor runs in reverse, withdrawing the nut 63 to lower the cam 33, the motor stopping when switch 84 is again opened.

Having thus described the invention, it is realized that changes may be made without departing from the spirit thereof and, therefore, it is not desired that the invention be limited to the precise illustration herein given except as set forth in the following claims.

What is claimed is:

1. In a system of the kind described, a device for effecting stopping of carts which comprises a cam, means adapted to be disposed below a floor to movably support said cam, means comprising a roller for withdrawing said cam into a floor and raising said cam above a floor, said cam having a cam edge to be engaged by a member carried by a cart and having a cam slot, means for pivoting said cam on an axis below floor level, said roller being mounted for movement into said slot, and means for actuating said roller whereby movement of said roller into said cam slot effects pivotal movement of said cam below floor level and whereby movement of said roller in an opposite direction effects movement of said cam above floor level.

2. In a device as set forth in claim 1, said actuating means comprising a lead screw, a reversible motor for rotating said lead screw, a nut on said lead screw, and said roller being secured to said nut whereby rotation of said lead screw in one direction or the other translates said roller in a corresponding direction.

3. In a device as set forth in claim 2, including guide rails and guide rollers, said guide rollers being secured to said nut and rollably engaging said guide rails whereby said nut is restrained to translatory motion.

4. In a device as set forth in claim 3, means for controlling said motor comprising a pair of spaced switches and a switch actuating member secured to said nut and engageable with said switches for actuation thereof at respective ends of traverse of said nut.

References Cited by the Examiner

UNITED STATES PATENTS

| | | | |
|---|---|---|---|
| 2,619,916 | 12/1952 | Rainier | 104—172 |
| 2,987,012 | 6/1961 | King | 104—172 |
| 3,044,416 | 7/1962 | Reibel | 104—178 X |
| 3,103,895 | 9/1963 | Bradt | 104—172 X |

ARTHUR L. LA POINT, *Primary Examiner.*

D. F. WORTH, *Assistant Examiner.*